United States Patent
Robison (10) Patent No.: US 6,820,253 B1
(45) Date of Patent: Nov. 16, 2004

(54) METHOD AND SYSTEM FOR INTERPROCEDURAL ANALYSIS WITH SEPARATE COMPILATION

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 09/672,229

(22) Filed: Sep. 27, 2000

(51) Int. Cl.$^7$ ................................................. G06F 9/45
(52) U.S. Cl. ..................... 717/141; 717/140; 717/144; 717/145; 717/151; 717/154; 717/155
(58) Field of Search ................................ 717/153, 157, 717/159, 161, 140, 141, 144, 145, 146, 151, 155, 156, 124

(56) References Cited

U.S. PATENT DOCUMENTS

| | | | | |
|---|---|---|---|---|
| 5,175,856 A | * | 12/1992 | Van Dyke et al. | 717/151 |
| 5,623,499 A | * | 4/1997 | Ko et al. | 714/724 |
| 5,671,419 A | * | 9/1997 | Carini et al. | 717/145 |
| 5,740,443 A | * | 4/1998 | Carini | 717/133 |
| 5,778,212 A | | 7/1998 | Dehnert et al. | |
| 6,282,701 B1 | * | 8/2001 | Wygodny et al. | 717/125 |
| 6,289,507 B1 | * | 9/2001 | Tanaka et al. | 717/155 |
| 6,438,594 B1 | * | 8/2002 | Bowman-Amuah | 709/225 |
| 6,530,079 B1 | * | 3/2003 | Midkiff et al. | 717/158 |
| 6,671,693 B1 | * | 12/2003 | Marpe et al. | 707/102 |
| 6,681,383 B1 | * | 1/2004 | Pastor et al. | 717/126 |

OTHER PUBLICATIONS

Title: A comprehensive Approach to Parallel Data Flow Analysis, author: Lee et al, ACM, 1992.*
Title: Formal Callability and its Relevance and Application to Interprocedural Data–flow Analysis, author: Jens Knoop, IEEE, 1998.*
Title: A Practical Interprocedural Data Flow Analysis Algorithm, author: Barth, ACM, 1978.*
Title: An Iterprocedural Data Flow Analysis Alogorithm, author: Barth, ACM, 1997.*
Lee, Yony–fong et al., "Performing Data Flow Analysis in Parallel," Nov. 1990, ACM Press, Proc. of the 1990 ACM/IEEE conf. on Supercomputing, p. 942–951.*

* cited by examiner

Primary Examiner—Chameli Chaudhuri Das
(74) Attorney, Agent, or Firm—Blakely, Sokoloff, Taylor & Zafman LLP (57) ABSTRACT

A method and system for interprocedural analysis with separate compilation is disclosed. In one embodiment, the method is applied to a software program having a plurality of separately compilable components. The method performs analyzing each component separately to create a plurality of local problems for each component and merging the local problems to create a global problem.

37 Claims, 8 Drawing Sheets

| $b_k = b_{k-1}$ | Done |
| --- | --- |
| $b_k > b_{k-1}$ | May recompile (.o possibly suboptimal) |
| otherwise | Must recompile (.o possibly invalid) |

UNREFERENCED
|
STATIC
|
EXTERNAL

```
/*Translation Unit #1 */
extern void b();
extern void e();
static void f() {
   c();
   e();
}
void d() {
   f()
}
void e() {
#if 0
   b();
#endif
}
main() {
   d();
}
```

```
/*Translation Unit #2 */
void b();
static void (*a)() = b;
extern void d();
extern void e();
void b() {
   d();
   (*a)();
}
void c() {
   e()
}
```

Fig. 9

| Unit: #1 Edges | Unit: #2 Edges | Function |
|---|---|---|
| main → d<br>d → @$_0$<br>@$_f$ → e | b → @$_a$<br>@$_a$ → b | {S,E} → S; U → U |
| @$_f$ → c | c → e<br>b → d | {S,E} → E; U → U |

METHOD AND SYSTEM FOR INTERPROCEDURAL ANALYSIS WITH SEPARATE COMPILATION

FIELD OF THE INVENTION

This invention relates to computer software compilation systems, and more specifically to a compiler that performs interprocedural analysis and optimization.

BACKGROUND OF THE INVENTION

A. Compilers and Interprocedural Analysis (IPA)

A program comprises one or more external source code files. Each source code file contains one or more translation units. A translation unit is a subroutine, function, or other separately compilable software entity. A compiler translates a program to one or more object files. In particular, a compiler compiles the source files of a program one at a time. For each source file, the compiler works on one translation unit at a time and generates a corresponding object file. The developer does not have to compile an entire program at one time, but rather, can compile the program in separate pieces as it is developed. After an entire program is compiled, a linkage editor processes all of the object files of the program and generates an executable program. Therefore, in a conventional compilation system, a developer invokes two separate steps: a compilation step and a link step.

There are two major phases of a compiler: a front end and a back end. The front end of a compiler consists of those phases that depend on the source language and are largely independent of the target computer. The front end typically performs lexical and syntactic analysis, creates the symbol table, performs semantic analysis, and generates intermediate code which is an intermediate representation of the source code.

The back end of a compiler includes those phases of compilation that depend on the target computer and generally do not depend on the source language, but depend on the intermediate code. The back end typically performs code optimization on the intermediate representation and generates the target object files.

A disadvantage of a conventional compilation system is that during compilation the compiler only has local information about the translation unit on which the compiler is currently working. The compiler does not have any global information pertaining to the entire program or to the relationships between the translation units of the program. Because of this lack of global information, the back end of the compiler is unable to perform certain optimizations, such as optimizing the operations involving global variables and the passing of constant parameters.

A well known technique that solves this disadvantage of conventional compilation systems is interprocedural analysis (IPA). IPA is a phase that is added to a compilation system to analyze an entire program and collect global information related to the translation units. Global information includes global variables and how the multiple translation units manipulate and reference the global variables. Once the global information is collected, it is then passed to the optimizer as part of the back end of the compilation system. Thus, when the optimizer optimizes a translation unit, the optimizer accesses this global information and performs additional and more aggressive optimization pertaining to global variables. IPA improves the efficiency of the generated object code by providing optimization at a global level, thereby improving the run-time performance of the executable program.

Existing IPA analysis defers analysis and optimization of a program until link time, at which time all translation units are effectively merged into one big aggregate translation unit, which is then analyzed and optimized. This means that if the programmer edits a single translation unit, the entire program must be reanalyzed and reoptimized. Furthermore, existing IPA analysis, by creating a monolithic translation unit, prevents distributed compilation of translation units by multiple processors.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION OF THE PREFERRED EMBODIMENT

A method and system for interprocedural analysis with separate compilation is disclosed. In one embodiment, the method is applied to a software program having a plurality of separately compilable components. The method performs analyzing each component separately to create a plurality of local problems for each component and merging the local problems to create a global problem.

The invention is a method of interprocedural analysis across multiple translation units. The method comprises local compilations of individual translation units and a global interprocedural solver (henceforth "IPA solver"). IPA solver optimizes the entire program during compilation of source files into object files. It collects information about global variables within the translation units, constants passed and how the multiple translation units manipulate and reference the global variables and constants. This information is passed to the local compiler.

The present invention recompiles only the edited translation unit at first, and then recompiles other translation units only if the change caused relevant changes to boundary conditions. Thus the present invention permits incremental update of programs.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An Exemplary Computer Architecture

Figure 1:
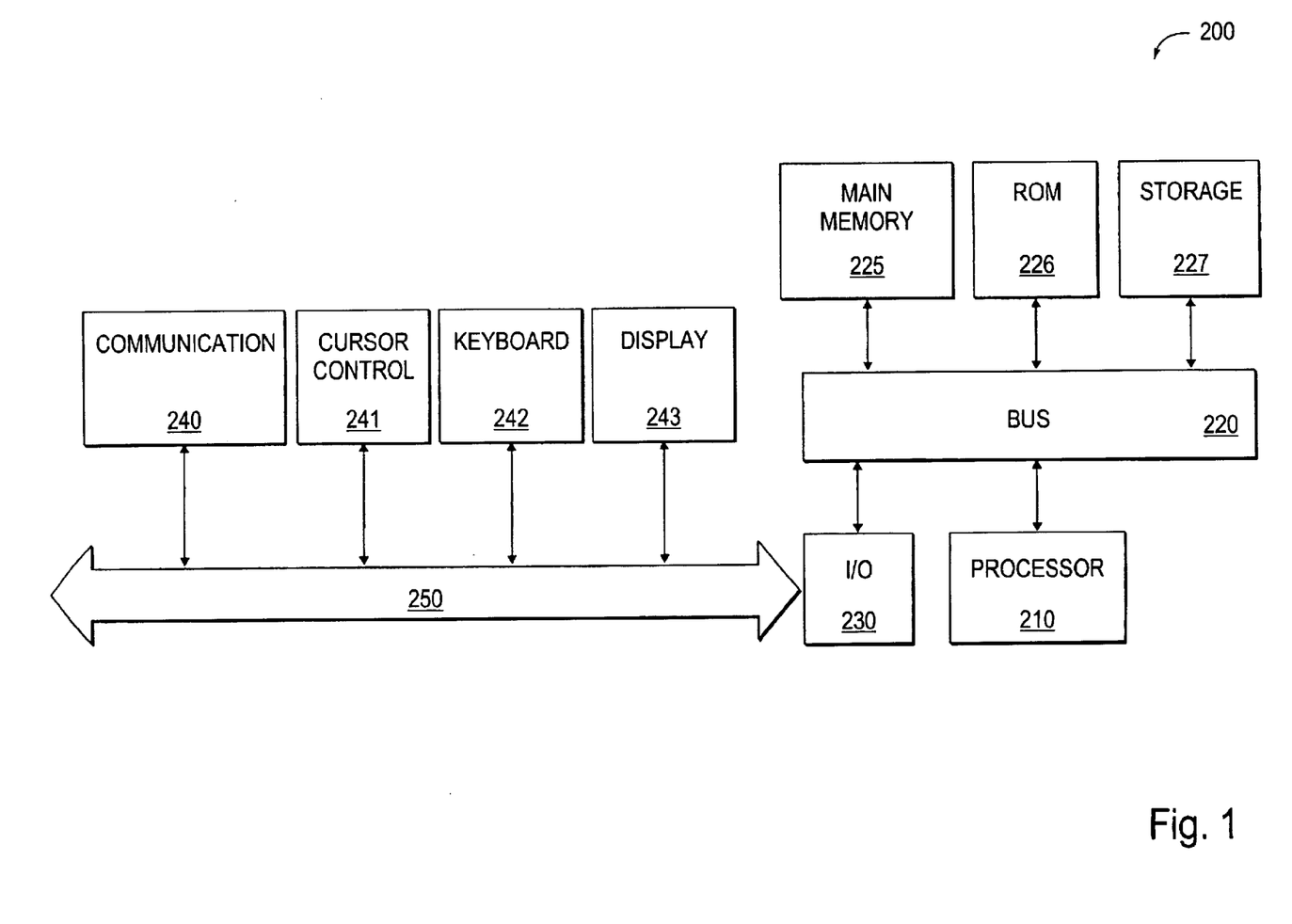
FIG. 1 illustrates a computer system representing an integrated multi-processor, in which elements of the present invention may be implemented.

FIG. 1 illustrates a computer system 200 representing an integrated multi-processor, in which elements of the present invention may be implemented. One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network. The communication device 240 may comprise a modem, a network interface card, or other well known interface device, such as those used for coupling to Ethernet, token ring, or other types of networks.

IPA Solver

The present method is based on domain decomposition of interprocedural analysis problems and solutions, coupled with replay of local compilations. A technique can be applied to solving interprocedural analysis problems, where domains may be established that signify different translation units. As defined above a translation unit means a subroutine, function, or other separately compilable software entity contained in each source code file. For example, the ".c" file in the C programming language is a separately compilable software entity. A program may comprise 1 to many of these separately compilable entities.

Figure 2:
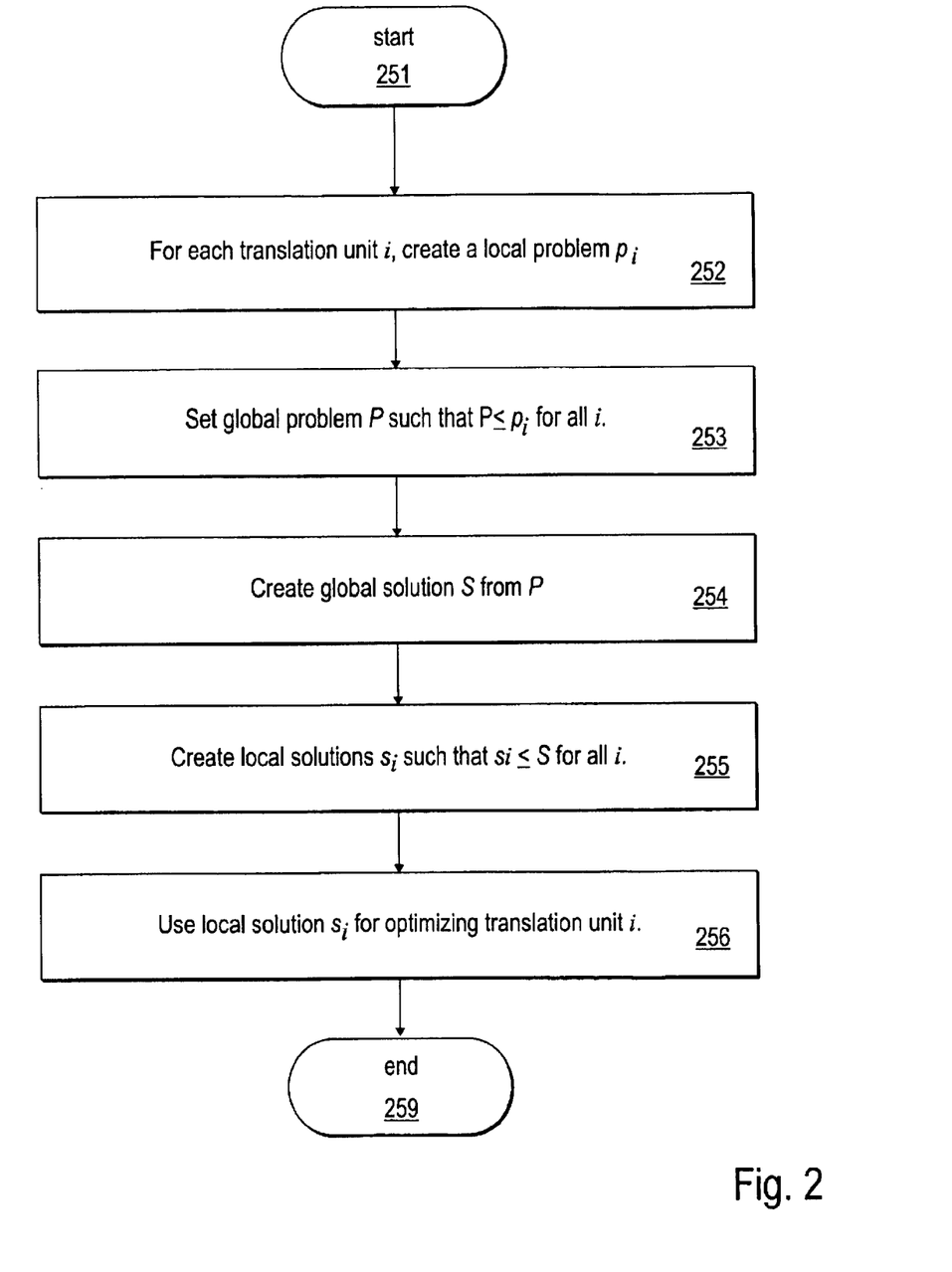
FIG. 2 illustrates an exemplary flow diagram of the techniques implemented by the present method.

FIG. 2 illustrates an exemplary flow diagram of the techniques implemented by the present method. The process commences at block 251. At processing block 252, let there be one or more translation units, each with a distinct label i. Each local compilation of a translation unit i creates a local problem $p_i$ for which a solution is of interest. The set of all possible problems must form a partial order, and the set of all possible solutions must form a partial order. A partial order is a relation, signified herewith by "$\leq$," that is transitive: $x \leq y$ and $y \leq z$ implies $x \leq z$.

reflexive: $x \leq x$ is always true.

antisymmetric: $(x \leq y)$ implies that either x=y or not($y \leq x$)

For example, the relation "is a divisor of" is a partial order for positive integers. So is "less or equal" for integers. If each element is a set, then the relation "is a subset of" is a partial order. The ordering is "partial" because not all pairs of elements can be compared. For example, 2 is not a divisor of 3, nor vice-versa. When dealing with a partial order, for any two elements x or y, one of the following four situations hold:

x=y is true $x \leq y$ is true but $x \leq y$ is false $y \leq x$ is true but $x \leq y$ is false both $x \leq y$ and $y \leq x$ are false.

In the last case, we say the values are "incomparable".

The solutions must be a monotone function of the problems: for two problems p and p' with respective solutions s and s', then $p \leq p'$ must imply $s \leq s'$. A function f that maps a lattice of values onto itself is monotone if $x \leq y$ implies $f(x) \leq f(y)$ for any two lattice elements x and y. The set of monotone functions over a lattice of values form a lattice of functions, where $\leq g$ if and only if $f(x) \leq g(x)$ for all lattice values x.

At processing block 253, the IPA solver creates a global problem P such that $P \leq p_i$ (for all i). At processing block 254, the IPA solver computes a global solution $s_i \leq S$ to the global problem. The IPA solver then finds local solutions $s_i$ such that $s_i \leq S$ (for all i) at processing block 255. Each local solution $s_i$ is used to optimize the ith translation unit at processing block 256. The present process ends at block 259.

Typically, the partial orders are lattices. The present inventive method and system solves for lattice values. A lattice is a partial ordering closed under the operations of a least upper bound and a greatest lower bound. Lattices are a standard part of discrete mathematics.

The "meet" of a set of elements is an element that is less or equal to every element in the set. For example, let "$\leq$" denote "is a divisor of". Then given {12,24,30}, the join is 6, because 6 is a divisor of each element in the set, and there is no larger divisor. 3 is a lower bound (divisor), but since it is a divisor of 6, is not the greatest. The "join" is an element that is greater or equal to every element in the set. For "is a divisor of", the "join" is simply the least common multiple. Closed means that the bounds exist in the set under discussion. For example, if the set were composite (non-prime) numbers only, then the meet of {12,15} (which is 3) would not be in the set.

The "top" of a lattice is the element that is the join for the set of all elements; the "bottom" is the meet for the set of all elements. (Thus "top" and "bottom" are the identity elements for "meet" and "join" respectively.) E.g., infinity is the top of the divisor lattice; and 1 is the bottom of said lattice.

If so, then the global problem P is the lattice-meet of all $p_i$ and each local solution is chosen such that S is the lattice-join of all $s_i$.

The lattices used in program optimization often relate to pessimism and optimism in the following sense. The partial ordering is that for two programs x and y, "$x \leq y$" if some deduction logic about x also is provably valid for y. Usually this means that y is somehow less complicated than x. Typically, as programs get more complicated (harder to understand), the answers we can deduce about their properties become more pessimistic. There's a natural covariance between the difficulty of the problem and the pessimism of the answer.

Figure 3:
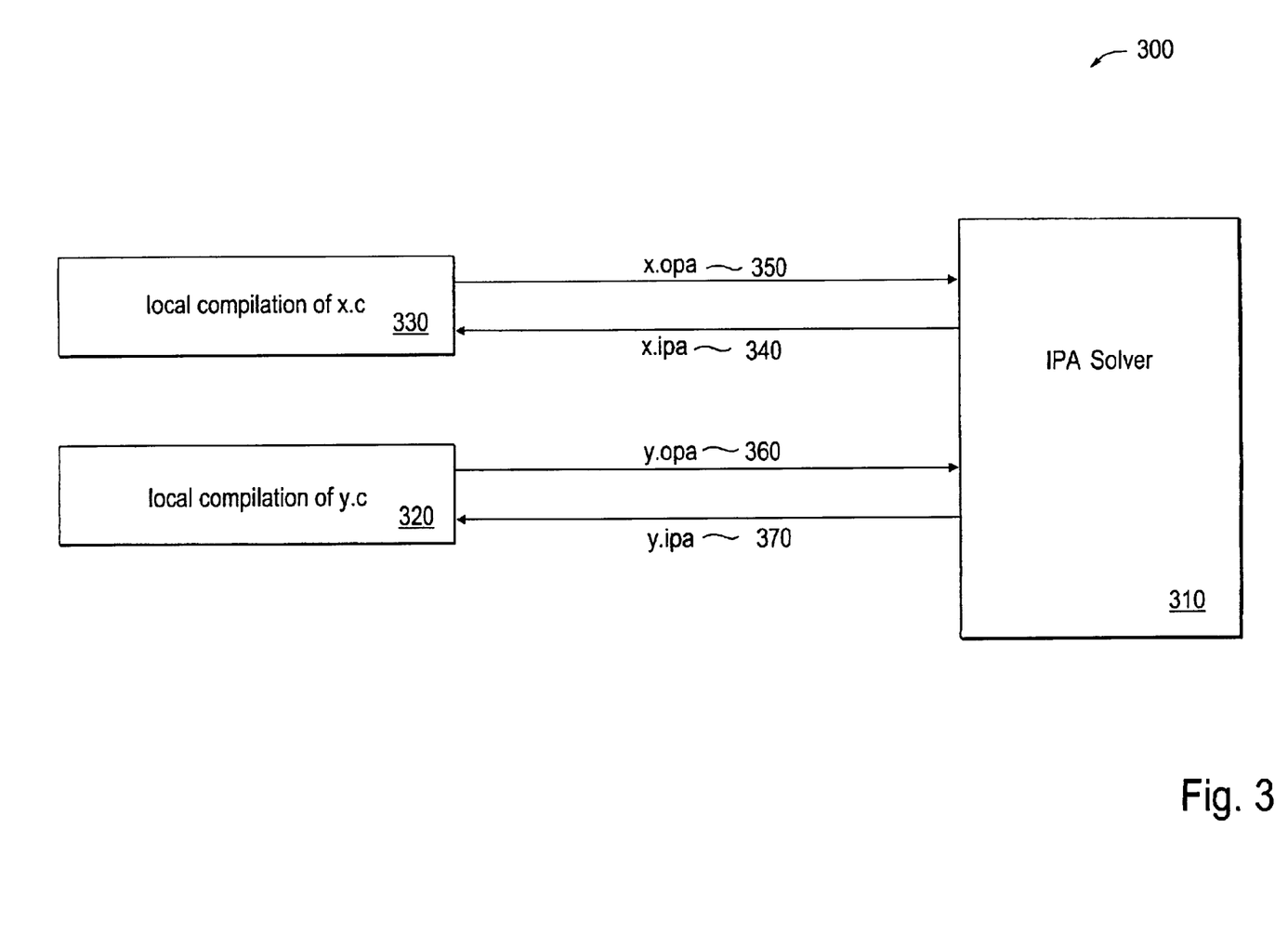
FIG. 3 illustrates an association of files with a translation unit.

Information between the local translation units and IPA solver is conveyed by files. FIG. 3 shows the relationship between two kinds of files, a translation unit and IPA solver 300. For each translation unit i, there are two files. The file i.opa 350, 360 conveys information from the local compilation to the IPA solver 310. It persists after the local compilations 320, 330 run until the local compilations 320, 330 run again. The file i.ipa 340, 370 conveys information from the IPA solver 310 to the local compilation 320, 330. It persists after the IPA solver 310 runs until the IPA solver 310 runs again. In another embodiment, an implementation using a single file is possible.

Figure 4:
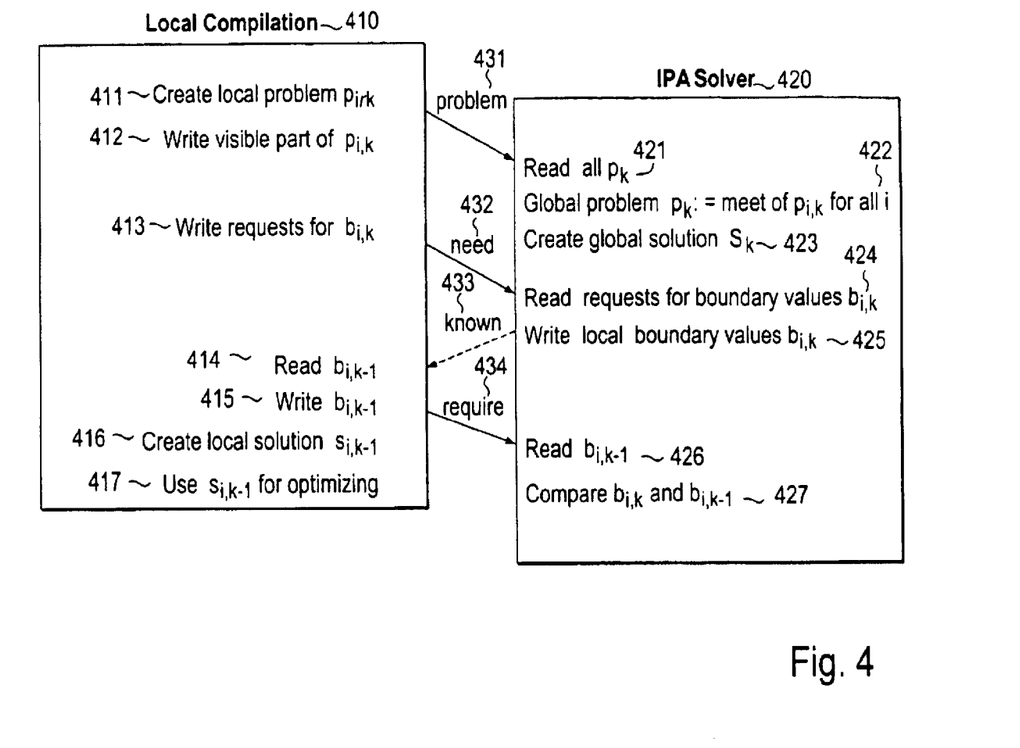
FIG. 4 illustrates interplay between local compilation and IPA solver.

FIG. 4 illustrates the interplay between local compilations and the IPA solver. In particular, it shows how the local compilations 320, 330 can be run separately from the IPA solver, and shows when information is transferred between the local compilations and IPA solver 310. The left side of FIG. 4 describes the actions of a local compilation 410. First, the local compilation 410 creates a local problem $P_{i,k}$ at line 411. The subscript i denotes that the problem is for the ith translation unit. The subscript k denotes the kth execution of the local compilation. Since the present system and method use the replay of compilations, it is important to keep straight from where execution information is generated. After creating a local problem $p_{i,k}$ the local compilation determines what part of the local problem affects the global solution. This part is called the visible part. The visible part is written to a "problem" section 431 of its opa file, to be read later by the IPA solver at line 412. The local compilation also writes out a request for boundary values $b_{i,k}$ that are used to compute a local solution $S_{i,k}$.

The "boundary values" are also known as boundary conditions. They describe the "flux" of information between translation units, without describing all the internal workings of the translation units. For instance, the "ground fault interrupter" circuits that are in most bathrooms and kitchens these days can provide an example of boundary values. They work by checking two boundary values: the current in each of the two wires. By subtracting the two values, the interrupter "knows" that all the electricity coming in is going back out the right way, without knowing the internal wiring of the connected appliance. But if someone accidentally shorts a connection, and electricity flows back through an alternative route to ground, the two boundary values differ, indicating a problem. In the IPA solver 420, the boundary values describe how a component of the software appears to the rest of the program. A change in a boundary value indicates a change that requires consideration. The changes form a lattice, so they can be compared to see if the change is serious enough to require recompiling parts of the program that depend upon assumptions based on the previous value.

This request is written to a "needed" section 432 of its opa file at line 413, to be read later by the IPA solver 420 at line 424. The local compilation then reads from a "known" section 433 of its ipa file the information $b_{i,k-1}$ which are the boundary values for the previous run of the local compilation at line 414. The local compilation writes these values to a require" section 434 of its opa file at line 415. The previous boundary values are used to compute a local solution $S_{i,k-1}$ to the current problem at line 416. At line 417, $S_{i,k-1}$ used for optimization. The fact that local compilations may be using incorrect boundary values is checked later by the IPA solver.

After all local compilations finish, the IPA solver 420 runs. It reads from the opa files all of the "problem" sections 431 at line 421. At line 422, it creates the global problem pk as the lattice-meet of the local problems from the sections. It solves for a global solution $S_k$ at line 423. It then reads (from the "needed" sections 432 of the opa files) requests by local compilations for boundary values at line 424. The IPA solver 420 writes these boundary values to the "known" section 433 of the ipa file of the requesting local compilation 410 at line 425. It then reads the "require" section 434 of the opa file to find the previous boundary conditions $b_{i,k-1}$, at line 426 and compares it with bk at line 427.

Figure 5:
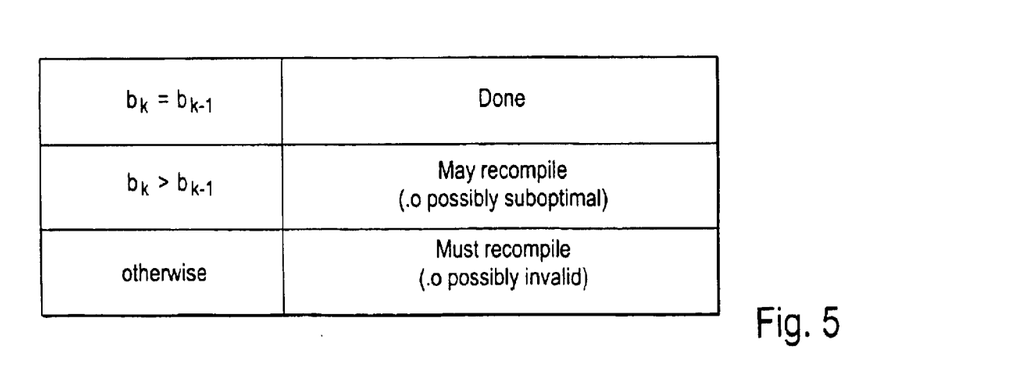
FIG. 5 illustrates decisions of whether to recompile.

FIG. 5 shows what actions are taken depending upon the result of comparing $b_{i,k}$ and $b_{i,k-1}$. If the values are equal, then translation unit i was optimized using information that was both correct and not subject to further improvement. There is no need to recompile translation unit i in this case. If the new boundary value is greater than the old value, then the translation unit i was optimized using information that was correct, but could have been better. In this case, translation unit i may be (but does not have to be) recompiled. If the new boundary value is less than the old value, or incomparable, then translation unit i was optimized using information that was incorrect, and must be recompiled.

Figure 6:
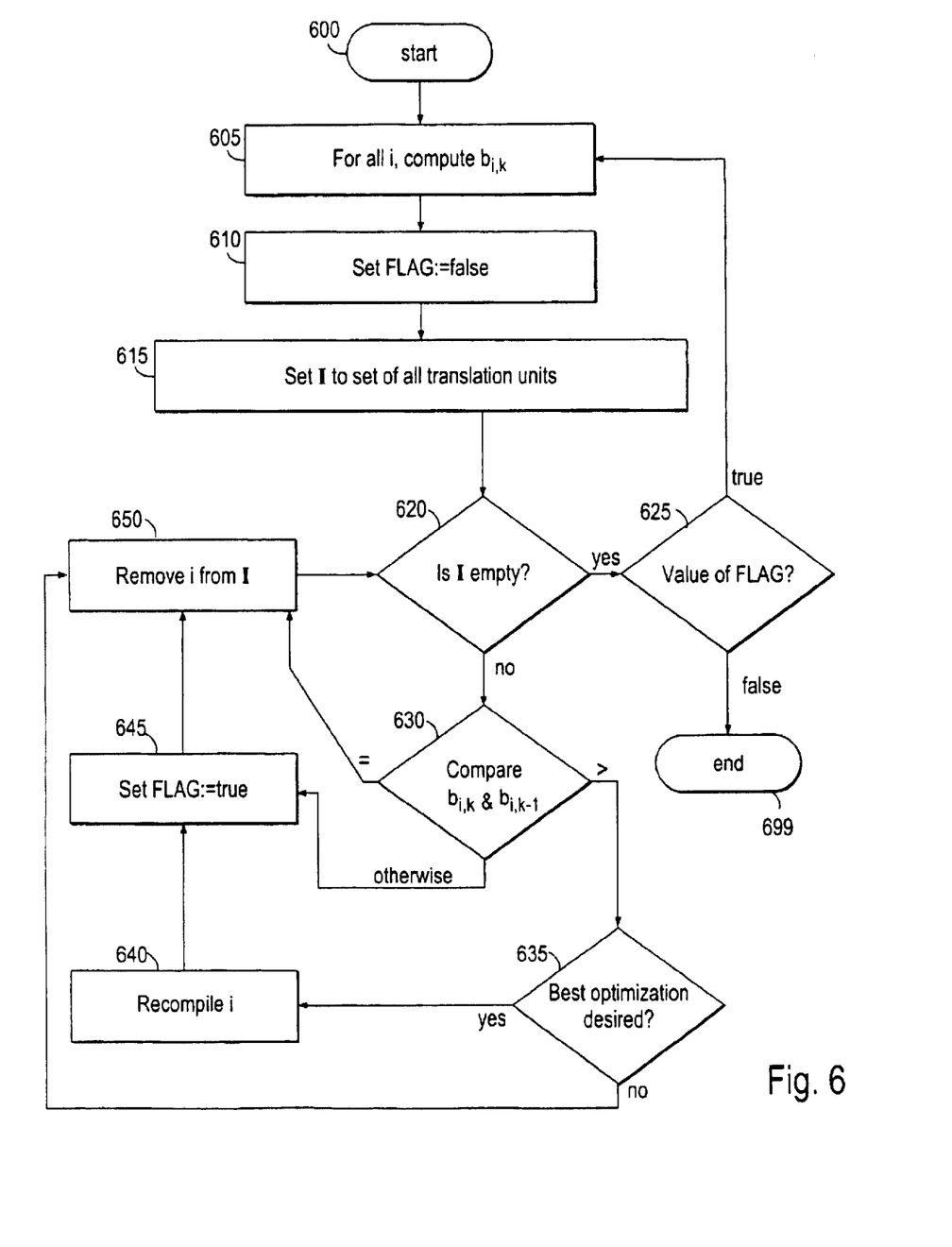
FIG. 6 illustrates a flow diagram of an exemplary process for recompilation.

FIG. 6 illustrates a flow diagram of an exemplary process for recompilation. The process commences at block 600. At processing block 605, processor 210 computes the boundary values $b_{i,k}$ as previously discussed for all translation units. FLAG is initialized to "false" at block 610 as a processing variable. At block 615, a set I is initialized to the set of all translation units that comprise the entire program being compiled. At decision block 620, the system checks whether I is empty. If I is empty, then flow passes on to decision block 625 whose flow is described below.

If I is not empty, then at block 630, the system compares the current boundary value $b_{i,k}$ with the previous boundary value $b_{i,k-1}$. If they are equal, at block 650 the translation unit i is removed from I. If $b_{i,k} > b_{i,k-1}$ then the system checks whether the user wants the best optimization possible (at the expense of perhaps more recompilation) at block 635. If the user does not desire greater optimization, then flow continues to block 650 where the translation unit is removed from I. If the user does desire great optimization, at block 640 translation unit I is recompiled and flow passes to block 645. Block 645 is also invoked if at decision block the system finds that neither $b_{i,k} = b_{i,k-1}$ nor $b_{i,k} > b_{i,k-1}$.

At block 645, the variable FLAG is set to true and flow continues to block 650 where I is removed from I. From block 650, flow continues to decision block 620 and processing continues as described above. After all translation units are considered, the system inspects the value of FLAG at decision block 625. If it is set to true, that indicates that some compilation unit I was recompiled, and the recompilation process must be iterated starting at block 605. If FLAG is set to false, that indicates that no recompilation is necessary and the process terminates at block 699.

The usual form for representing the problem and solution is a directed graph. A directed graph (in this sort of work) is a set of "vertices" and a set of directed "edges". Each edge points from its "tail" vertex to its "head" vertex. An edge from vertex u to vertex v is denoted u→v.

Each vertex of the graph has a lattice value, and each edge has a monotone lattice transfer function. A "problem" section 431 describes a subgraph, and associated lattice values and transfer functions. A "need" section 432 is a set of vertices for which the lattice values are needed. The meet of the problems is a graph that is the union of the subgraphs. Multiple edges between the same pair of vertices are reduced to a single edge by replacing them with a single edge whose transfer function is the meet of the transfer functions of the multiple edges. The lattice value of a vertex for the global problem is the meet of the lattice values for the same vertex in each local problem in which it occurs.

Figure 7:
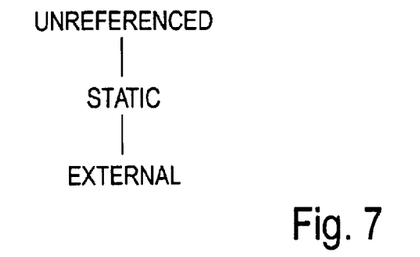
FIG. 7 illustrates an example lattice for analysis.
Figure 8:
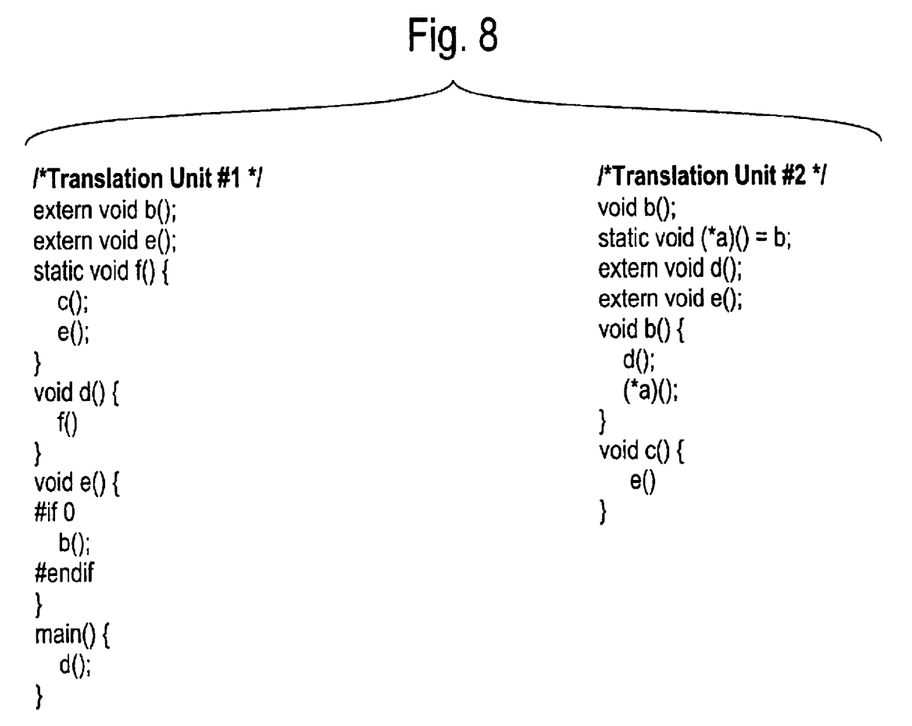
FIG. 8 illustrates an example program of two translation units.
Figure 9:
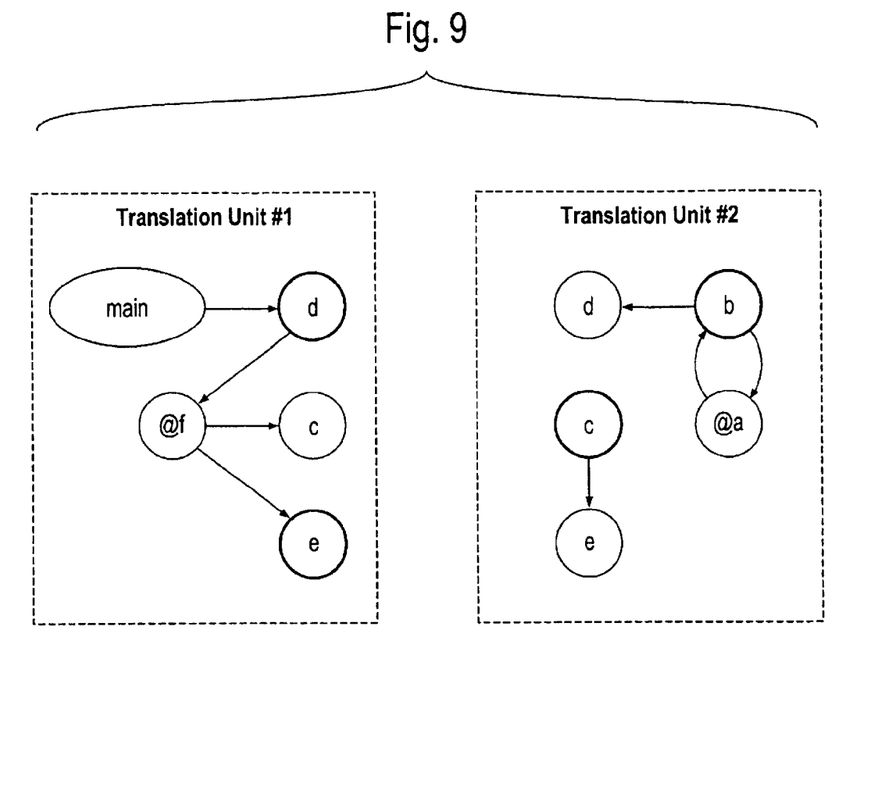
FIG. 9 illustrates problem graphs for the example program.

Taking the union of the graphs for local problems requires a mechanism to identify vertices that should be merged. This is done by having the local compilations attach labels to vertices that might have to be merged. The labeling depends upon the type of problem being solved. For simple problems, each vertex might correspond to the link name of a symbol. The invention also supports the notion of "anonymous symbols" in order to label vertices corresponding to entities that are not visible to other translation units, but nonetheless are useful for stating the global problem. The example transform will transform file-scope objects (routines and variables) entities in each translation unit as follows:

(a) Unreferenced entities are removed (b) Entities referenced within only a single translation unit are given static linkage. The problem is interprocedural since one translation unit may reference an object in another translation unit. FIG. 7 shows a three-point value lattice for the problem. The lattice ordering is UNREFERENCED, STATIC, and EXTERNAL. FIG. 8 shows an example in the C programming language of two translation units. FIG. 9 shows the corresponding problem graph. The heavy circles are the "needed" set. For the problem under discussion, the value of a vertex is in "needed" by a translation unit if the corresponding file-scope entity is defined in the translation unit and possibly exported to another translation unit. The global solution value for said vertex will indicate whether the entity can be removed or given static linkage.

Static linkage means that an entity (variable or routine) is referenced by name only within the translation unit in which it is defined. For example, if there are two translation units (a) and (b) with:

| (a) static int x = 1; | (b) static int x = 2; |
|---|---|
| int y = 2; | int z = y; | the "x"'s mentioned are each local to their respective translation units, but the y and z are globally shared (and z ends up with the value 2 assigned from y). Translation unit (a) is still allowed to pass a pointer to x as a parameter to a function in (b).

The vertices for objects f and a are labeled with anonymous symbols @f and @a respectively. They are anonymous because the corresponding entities have static linkage and thus cannot be seen directly outside their respective translation units. The values for anonymous vertices are not needed, because their values can be computed from boundary information. The lattice values at the vertices are all UNREFERENCED (top of lattice), except for "main", which a priori is known to be implicitly referenced, and thus gets a value of EXTERNAL.

Figure 10:
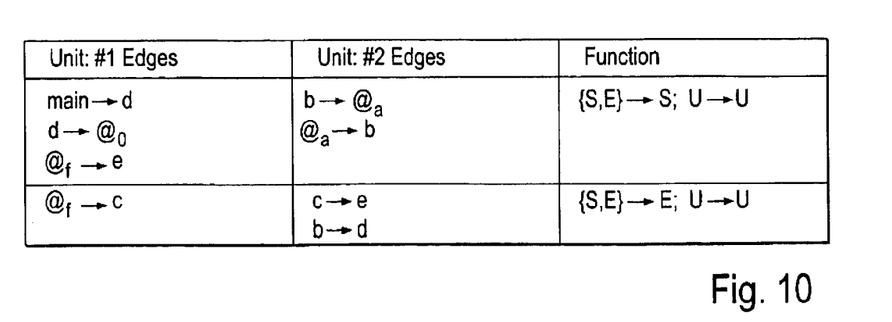
FIG. 10 illustrates transfer functions for edges in problem graphs.

FIG. 10 shows the transfer functions on the edges. The lattice points are abbreviated by their initial letter (U, S, and E). For instance, the edge from d to e ($@_{14}e$) maps the lattice value UNREFERENCED to UNREFERENCED, and other lattice values to STATIC. The rationale is that if f is referenced in the program, then e is (indirectly) referenced via f. The other lattice values are mapped to STATIC since the reference is between objects within the same translation unit. Each subgraph (and associated lattice values and functions are written to the opa file corresponding to the respective translation unit.

Anonymous symbols would also be used for labeling local variables if there were any that are relevant. For example, a file-scope routine x might have a local variable y to which is assigned the address of another file-scope entity z. Then invention may represent this as edges from x to y and y to z. Of course the vertex y can be removed by collapsing the edges into a single edge from x to z, but this destroys the sparsity of the graph if y has many incoming and outgoing edges. Thus anonymous vertices are often useful for specifying problems, even when their solution values are not of interest.

Figure 11:
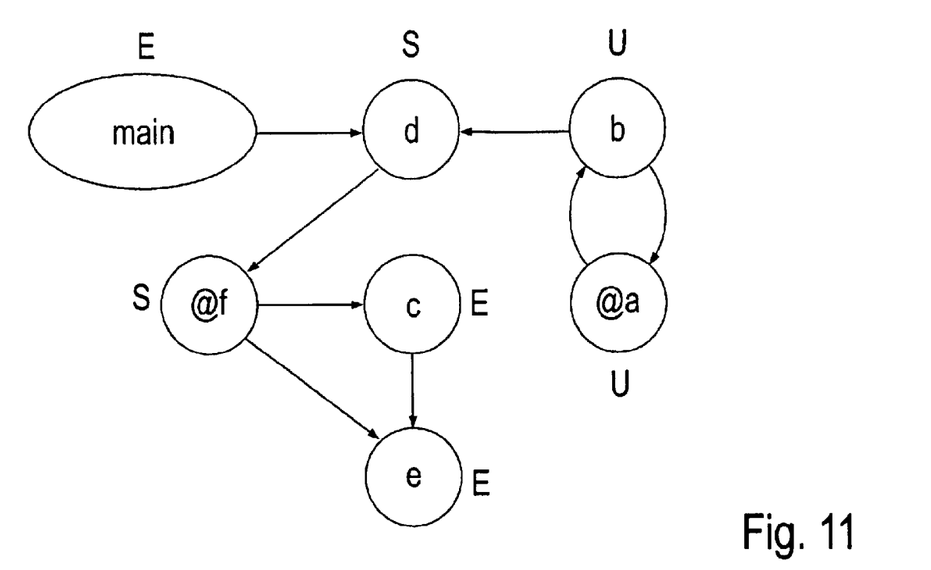
FIG. 11 illustrates global solutions for example problems.

The IPA solver links named vertices together to build the global problem shown in FIG. 11 and computes a fixed-point solution. When the problem is represented as a graph with transfer functions, a fixed-point solution is as follows. Let val(v) denote the value associated with each vertex v, and fun(e) denote the transfer function associated with each edge e. The solution is a mapping of vertices to lattice values, denoted sol(v) such that:

a. for all vertices v, sol(v)≦val(v), and b. for all edges e of the form u→v: sol(v)≦fun(e)(sol(u))

It is not necessary, but recommended that the maximal fixed-point solution be computed. A solution "sol" is maximal if there is no other different solution "sol" such that c. for all vertices v, sol(v)≦sol'(v)

The abbreviated lattice values for the solution are shown next to each vertex in FIG. 11. Then for each translation unit, the values of its needed vertices are written to the "known" section of that translation unit's ipa file.

The IPA solver then inspects the "required" sections, and since this is the first run of the solver, they are trivially lattice-bottom, which is worse than any other lattice value, thus comparison of "known" and "required" indicates that recompilation might improve things, but is not required.

For each recompilation performed, the "problem" and "needed" sections are regenerated as before. The "known" section is read, which provides boundary conditions for the local solution. The section copied to "required" are the boundary values. A solution to the local problem, which is a subgraph, is computed. For translation unit #1, its local solution indicates that routine d may be given static linkage. For translation unit #2, its local solution indicates that pointer a and routine b may be removed.

The subsequent run of the IPA solver will compute a new global solution, and detect that the "required" values match the "needed" values of the new global solution, and thus no further recompilation is necessary.

Figure 12:
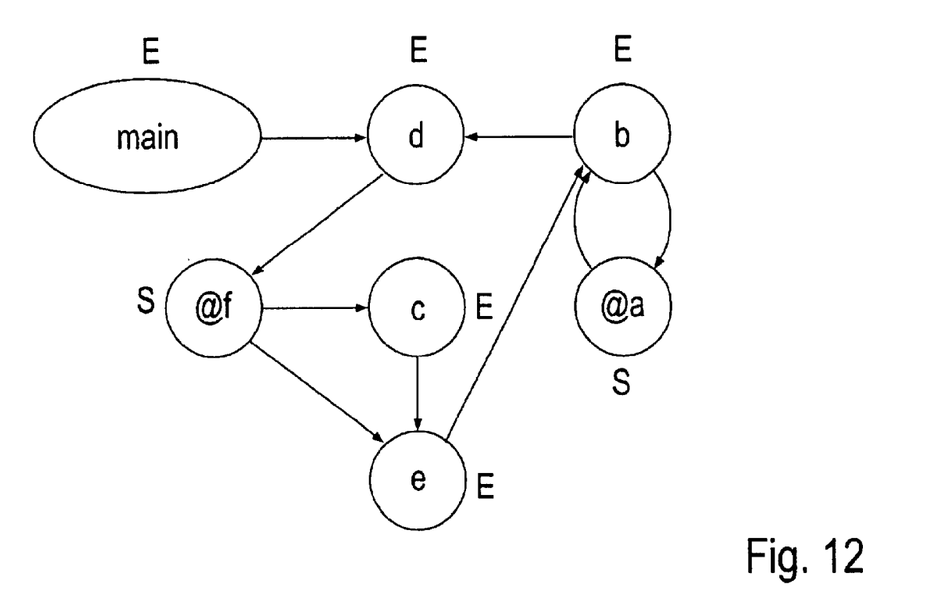
FIG. 12 illustrates global solutions after #if 0 is changed to #if 1 in FIG. 8.

Now suppose that translation unit #1 is edited to change the "#if 0" to "#if 1", and recompiled. When the IPA solver is subsequently run, it will discover that the solution for d is now EXTERNAL (but "required" says STATIC), and the solution for "b" is now STATIC (but "required" says UNREFERENCED), as shown in FIG. 12. The solution for @, also has changed, but is irrelevant because it is not a needed vertex. After both translation units are recompiled, the "needed" and "required" values will match, and the IPA solver is finished.

The present invention permits each translation unit to be compiled in parallel by a different processor; the only serial bottleneck is when the IPA solver itself runs. After the IPA solver runs, required recompilations can also be done in parallel. Experience indicates that the IPA solver runs quite quickly compared to the rest of the compilation.

Boundary conditions, and not local solutions are exchanged between the local compilations and the IPA solver. Not only do the boundary conditions take up less file space, but they are less likely to change than the local solution. For instance, the local problem might change in a way that changes the local solution, but not the boundary conditions. By transmitting (and comparing) boundary solutions, the present invention avoids unnecessary recompilations.

A method for interprocedural analysis with separate compilation is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

What is claimed is:

1. A method, comprising:

a) analyzing each separately compilable program component of a software program having a plurality of separately compilable program components, to create a plurality of local problems for each separately compilable program component;

b) merging the local problems to create a global problem;

c) computing a global solution to the global problem; and d) splitting the global solution into local solutions.

2. The method of claim 1, further comprising:

e) removing uncallable routines within the software program.

3. The method of claim 1, further comprising:

e) determining local routines that are only referenced within a single separately compilable program component.

4. The method of claim 1, further comprising:

e) writing each local problem to storage for each separately compilable program component;

f) reading from storage a previous local solution computed for the local problem; and g) using the previous local solution to optimize each separately compilable program component.

5. The method of claim 1, further comprising:

e) partially ordering the local problems and global problem into a problem partial order;

f) partially ordering the local solutions and global solution into a solution partial order; and g) associating the local problems to the local solutions.

6. The method of claim 5, further comprising h) comparing a present boundary value with a previous boundary value to determine if the separately compilable program component should be recompiled.

7. The method of claim 1, further comprising:

e) representing the local problems as directed graphs having edges and vertices, wherein i) each edge has an associated monotone transfer function;

ii) each vertex has an initial value;

iii) a subset of vertices is marked as needed values; and f) representing the local solutions as maps from vertices onto values.

8. The method of claim 7, wherein the global problem precedes the local problems in the problem partial order, and the local solutions precede the global solution in the solution partial order.

9. The method of claim 7, further comprising generating a directed graph for the global problem by merging local problem vertices that have identical names.

10. A system, comprising:

a) means for analyzing each separately compilable program component, of a software program having a plurality of separately compilable program components, to create a plurality of local problems for each separately compilable program component;

b) means for merging the local problems to create a global problem;

c) means for computing a global solution to the global problem; and d) means for splitting the global solution into local solutions.

11. The system of claim 10, further comprising:

e) means for removing uncallable routines within the software program.

12. The system of claim 10, further comprising:
e) means for determining local routines that are only referenced within a single separately compliable program component.

13. The system of claim 10, further comprising:
e) means for writing each local problem to storage for each separately compilable program component;
f) means for reading from storage a previous local solution computed for the local problem; and
g) means for using the previous local solution to optimize each separately compilable program component.

14. The system of claim 10, further comprising:
e) means for partially ordering the local problems and global problem into a problem partial order;
f) means for partially ordering the local solutions and global solution into a solution partial order; and
g) means for associating the local problems to the local solutions.

15. The system of claim 14, further comprising
h) means for comparing a present boundary value with a previous boundary value to determine if the separately compilable program component should be recompiled.

16. The system of claim 10, further comprising:
e) means for representing the local problems as directed graphs having edges and vertices, wherein
i) each edge has an associated monotone transfer function;
ii) each vertex has an initial value;
iii) a subset of vertices is marked as needed values; and
f) means for representing the local solutions as maps from vertices onto values.

17. The system of claim 16, wherein
the global problem precedes the local problems in the problem partial order, and
the local solutions precede the global solution in the solution partial order.

18. The system of claim 16, further comprising means for generating a directed graph for the global problem by merging local problem vertices that have identical names.

19. A computer-readable medium having stored thereon a plurality of instructions, said plurality of instructions when executed by a computer, cause said computer to perform:
a) analyzing each separately compilable program component, of a software program having a plurality of separately compilable program components, separately to create a plurality of local problems for each separately compilable program component;
b) merging the local problems to create a global problem
c) computing a global solution to the global problem; and
d) splitting the global solution into local solutions.

20. The computer-readable medium of claim 19 having stored thereon additional instructions, said additional instructions when executed by a computer, cause said computer to further perform:
e) removing uncallable routines within the software program.

21. The computer-readable medium of claim 19 having stored thereon additional instructions, said additional instructions when executed by a computer, cause said computer to further perform:
e) determining local routines that are only referenced within a single separately compilable program component.

22. The computer-readable medium of claim 19 having stored thereon additional instructions, said additional instructions when executed by a computer, cause said computer to further perform;
e) writing each local problem to storage for each separately compilable program component;
f) reading from storage a previous local solution computed for the local problem; and
g) using the previous local solution to optimize each separately compilable program component.

23. The computer-readable medium of claim 19 having stored thereon additional instructions, said additional instructions when executed by a computer, cause said computer to further perform:
e) partially ordering the local problems and global problem into a problem partial order;
f) partially ordering the local solutions and global solution into a solution partial order; and
g) associating the local problems to the local solutions.

24. The computer-readable medium of claim 23 having stored thereon additional instructions, said additional instructions when executed by a computer, cause said computer to further perform:
h) comparing a present boundary value with a previous boundary value to determine if the separately compilable program component should be recompiled.

25. The computer-readable medium of claim 19 having stored thereon additional instructions, said additional instructions when executed by a computer, cause said computer to further perform:
e) representing the local problems as directed graphs having edges and vertices, wherein
i) each edge has an associated monotone transfer function;
ii) each vertex has an initial value;
iii) a subset of vertices is marked as needed values; and
f) representing the local solutions as maps from vertices onto values.

26. The computer-readable medium of claim 25 having stored thereon additional instructions, said additional instructions when executed by a computer, cause said computer to further perform:
g) ordering all problems such that the global problem precedes the local problems in the problem partial order, and
h) ordering all solutions such that the local solutions precede the global solution in the solution partial order.

27. The computer-readable medium of claim 25 having stored thereon additional instructions, said additional instructions when executed by a computer, cause said computer to further perform generating a directed graph for the global problem by merging local problem vertices that have identical names.

28. A system, comprising:
a processor;
memory connected to the processor storing instructions for interprocedural analysis executed by the processor;
storage connected to the processor that stores a software program having a plurality of separately compliable program components,
wherein the processor analyzes each separately compilable program component separately to create a plurality of local problems for each separately compilable program component, merges the local problems to create a global problem, computes a global solution to the global problem and splits the global solution into local solutions.

29. The system of claim 28 wherein the processor removes uncallable routines within the software program and determines local routines that are only referenced within a single separately compliable program component.

30. The system of claim 28 wherein the processor removes uncallable routines within the software program and determines local routines that are only referenced within a single separately compliable program component.

31. The system of claim 29, wherein the processor
writes each local problem to storage for each separately compliable program component;
reads from storage a previous local solution computed for the local problem; and
uses the previous local solution to optimize each separately compliable program component.

32. The system of claim 29, wherein the processor:
arranges the local problems and global problem into a problem partial order;
arranges the local solutions and global solution into a solution partial order; and
associates the local problems to the local solutions.

33. The system of claim 29, wherein the processor:
represents the local problems as directed graphs having edges and vertices, wherein
i) each edge has an associated monotone transfer function;
ii) each vertex has an initial value;
iii) a subset of vertices is marked as needed values; and
represents the local solutions as maps from vertices onto values.

34. The system of claim 29, wherein the processor:
arranges the local problems and global problem into a problem partial order;
arranges the local solutions and global solution into a solution partial order; and
associates the local problems to the local solutions.

35. The system of claim 29, wherein the processor:
orders all problems such that the global problem precedes the local problems in the problem partial order, and
orders all solutions such that the local solutions precede the global solution in the solution partial order.

36. The system of claim 34, further comprising:
comparing a present boundary value with a previous boundary value to determine if the separately compliable program component should be recompiled.

37. The system of claim 34, wherein the processor generates a directed graph for the global problem by merging local problem vertices that have identical names.

* * * * *

UNITED STATES PATENT AND TRADEMARK OFFICE
CERTIFICATE OF CORRECTION

PATENT NO. : 6,820,253 B1
DATED : November 16, 2004
INVENTOR(S) : Robison

It is certified that error appears in the above-identified patent and that said Letters Patent is hereby corrected as shown below:

Column 5,
Line 12, delete "P≤p," and insert -- $P \leq p_i$ --.

Column 6,
Line 47, before "used", insert -- is --.

Column 7,
Lines 25, 29 and 34, delete "I" and insert -- i --.

Column 8,
Line 43, delete "($@_{14}$ e")" and insert -- ("$@_f \rightarrow e$") --.

Column 9,
Line 36, delete "@," and insert -- $@_a$ --.

Signed and Sealed this

Twenty-eighth Day of June, 2005

JON W. DUDAS
*Director of the United States Patent and Trademark Office*